United States Patent [19]
Lee

[11] Patent Number: 6,076,970
[45] Date of Patent: *Jun. 20, 2000

[54] FLUID BEARING APPARATUS

[75] Inventor: Chang-woo Lee, Kyonggi-do, Rep. of Korea

[73] Assignee: Samsung Electronics Co., Ltd., Kyungki-do, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/961,273

[22] Filed: Oct. 30, 1997

[30] Foreign Application Priority Data

Oct. 30, 1996 [KR]  Rep. of Korea ...................... 96-50380

[51] Int. Cl.⁷ ..................................................... F16C 17/04
[52] U.S. Cl. ............................................................ 384/123
[58] Field of Search ................................... 384/112, 123, 384/113, 115, 121

[56] References Cited

U.S. PATENT DOCUMENTS

| | | | |
|---|---|---|---|
| 5,277,499 | 1/1994 | Kameyama | 384/123 |
| 5,466,070 | 11/1995 | Nakasugi | 384/112 |
| 5,855,438 | 1/1999 | Lee | 384/112 |

*Primary Examiner*—Lenard A. Footland
*Attorney, Agent, or Firm*—Sughrue, Mion, Zinn, Macpeak & Seas, PLLC

[57] ABSTRACT

A fluid bearing apparatus in which dynamic pressure generating grooves are subjected to a change in shape to increase the amount of fluid to be introduced into the grooves of a thrust bearing. In the fluid bearing apparatus, in order to introduce an increased amount of fluid into the dynamic pressure generating grooves formed on a side of the thrust bearing which supports a rotating shaft, a fluid inlet of the dynamic pressure generating grooves is shaped with arc portions for the fluid to be easily introduced thereinto. Accordingly, a fluid pressure in the dynamic pressure generating grooves is increased.

5 Claims, 2 Drawing Sheets

FLUID BEARING APPARATUS

BACKGROUND OF THE INVENTION

1. Field of the Invention

The present invention relates to a fluid bearing apparatus, and more particularly to a fluid bearing apparatus having an increased contacting area of a bearing and rotating elements and a compact size.

2. Description of the Related Art

Recently, with improvements in the fields of information and computer technology, a computer, an audio system, and an image device have been compact in size, thereby there has arisen a need for parts of the computer, the audio system, and the image device to have high accuracy.

In driving motors for various machines, such as a spindle motor for a hard disk drive in the field of auxiliary memory devices and a scanning motor for a laser printer in the field of computer technologies, a driving apparatus for driving a laser disk and a compact disk in the audio system, and a head driving motor of a video cassette recorder and a camcorder, commonly rotate a rotary shaft mounted in the driving motors with high velocity so that readers and recorders of the hard disk drive, the laser printer, the audio system, the video cassette recorder, and the camcorder carry out recording and reproducing of data.

The rotary shaft rotates at very high velocity while creating an oscillation and a vibration. Thereby, the computer, the laser printer, the audio system, the video cassette recorder, the camcorder, and the like using the rotary shaft may have a critical defect.

Accordingly, bearings, as a mechanic element, are used for overcoming problems generated by the high velocity rotation of the rotary shaft of driving motors. There are different kinds of bearings, but a fluid bearing apparatus preferably is used for the rotary shaft rotating at high velocity.

The fluid bearing apparatus generally has dynamic pressure generating grooves formed therein at a predetermined depth. There are two types of the dynamic pressure generating grooves. One type of the dynamic pressure generating grooves is a spiral shape and the other type of the dynamic pressure generating grooves is a herringbone shape.

The dynamic pressure generating grooves having a herringbone shape rotate themselves or the shaft supported by the dynamic pressure generating grooves rotates while the fluids are introduced into the dynamic pressure generating grooves so as to create the vortex flows. The fluids flow through the fluid inlets toward a bending portion and are collected at the bending portion so as to generate a relatively higher pressure.

Also, the spiral type of the dynamic pressure generating grooves may be formed on a surface of the bearing in order to support a thrust load of the rotary shaft.

The herringbone type of the dynamic pressure generating grooves according to the conventional art, support the thrust load of the rotary shaft, however, edges of side walls of the dynamic pressure generating grooves are sharply cut. Thus, not enough fluids are introduced into the dynamic pressure generating grooves to generate the fluids pressure required to shift the rotary shaft in a short time. As a result, there is a problem in that as the length of time required to shift the rotary shaft increases, a friction is generated between the rotary shaft and the thrust bearing and an overload is charged to the rotary shaft and an abrasion of the bearing and a consumption of electric power increases.

SUMMARY OF THE INVENTION

The present invention has been made to overcome the above described problem of the conventional apparatus. It is an object of the present invention to provide a fluid bearing apparatus in which fluid inlets of dynamic pressure generating grooves in a thrust bearing are enlarged for increasing the amount of fluid to be introduced into the dynamic pressure generating grooves.

To accomplish the above object of the present invention, there is provided a fluid bearing apparatus comprising:

a sleeve for having a bushing portion formed therein;

a shaft for having a first dynamic pressure generating grooves formed at a lower portion thereof corresponding to the bushing;

a thrust bearing for having a second dynamic pressure generating grooves formed on an upper surface thereof, the second dynamic pressure generating grooves generating a predetermined fluid pressure when a fluid is introduced into the second dynamic pressure generating grooves and fluid inlets of the second dynamic pressure generating grooves being enlarged for amount of the fluid to be introduced into the second dynamic pressure generating grooves; and a bearing bracket which the sleeve and the thrust bearing are disposed and fixed thereto.

In the fluid bearing apparatus according to the present invention, the dynamic pressure generating grooves respectively include a first and second side walls of which edges are curved in a predetermined curvature.

The fluid inlets are formed at both side of the second dynamic pressure generating grooves and associated with each other so that the introduced fluids are collected at a point.

Alternately, the dynamic pressure grooves are formed around a central axis of the thrust bearing in a spiral shape.

BRIEF DESCRIPTION OF THE DRAWINGS

The above object and other advantages of the present invention will become more apparent by describing in detail the preferred embodiment thereof with reference to the attached drawings, in which.

DESCRIPTION OF THE PREFERRED EMBODIMENT

Hereinafter, a preferred embodiment of the present invention will be described in detail with reference to the accompanying drawings.

Figure 1:
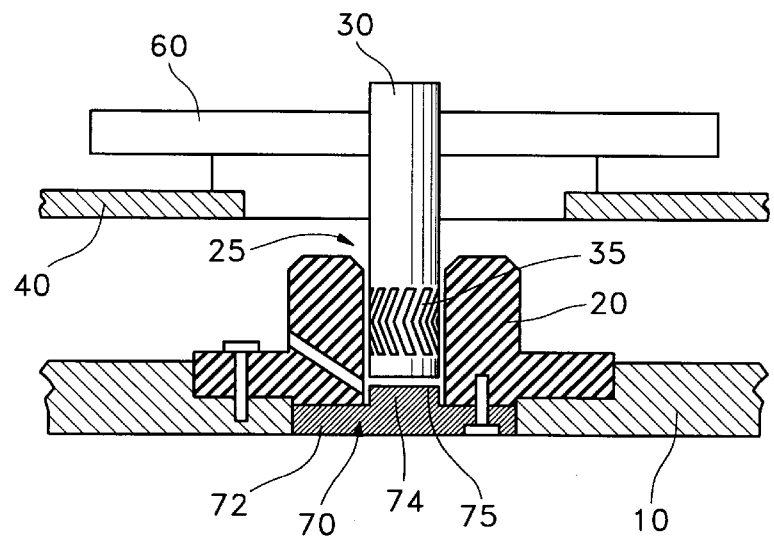
FIG. 1 is a sectional view of a fluid bearing apparatus according to an embodiment of the present invention, which is applied to a scanning motor.

FIG. 1 is a sectional view of a fluid bearing apparatus according to an embodiment of the present invention, which is applied to a scanning motor of a laser printer. As shown in FIG. 1, a sleeve 20 includes a bushing portion of which an inner diameter is larger than a diameter of a shaft 30. First dynamic pressure generating grooves 35 in a herringbone shape are formed on the shaft 30 or an inner peripheral surface of the bushing portion of the sleeve opposite to the shaft 30 so as to generate fluid pressure resulting in rotating the shaft 30 without contacting with the bushing portion of the sleeve 20. FIG. 1 shows that the first dynamic generating grooves 35 are formed on the shaft 30.

A clearance between the first dynamic generating grooves 35 and the sleeve 20 is several $\mu$m. The shaft 30 extends through a polygon mirror 60. The polygon mirror 60 is combined with an annular plate 40 on which a rotor (not shown) is mounted. A stator (not shown) is mounted on a bearing bracket 10 and spaced apart form the rotor at a predetermined distance.

On the other hand, a thrust bearing 70 is inserted into the bearing bracket 10 and connected to the sleeve 20 by a screw. Herringbone shaped second dynamic pressure generating grooves 75 are formed on a surface of the thrust bearing 70 in order to support a thrust load of the shaft 30. Thereby, the shaft 30 can be stable rotated.

Figure 2A:
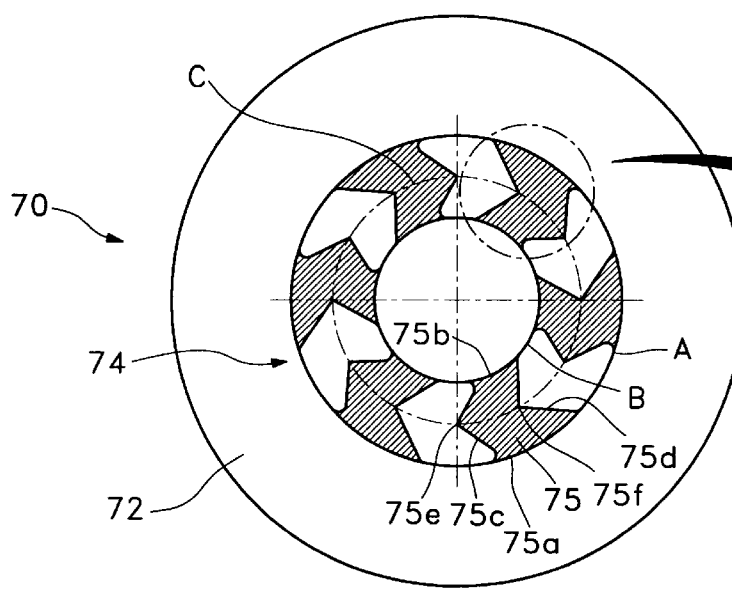
FIGS. 2A–2B are a plan view of dynamic pressure generating grooves in the fluid bearing apparatus of FIG. 1.

FIG. 2A is a plan view of dynamic pressure generating grooves in the fluid bearing apparatus of FIG. 1. Referring to FIGS. 1 and 2A, the thrust bearing 70 includes three portions: a thrust bearing abutment portion 72 combined with the sleeve 20 and the bearing bracket 10, a thrust bearing body portion 74 extending upwardly from an upper surface of the thrust bearing abutment portion 72 and inserted into a through hole 25 of the sleeve 20, and the second dynamic pressure generating grooves 75 formed on a surface of the thrust bearing body 74.

The thrust bearing 70 is made of a strong and wear-resistant material for making contact with the shaft 30 when the polygon mirror 60 starts rotating and stops rotating.

The thrust bearing abutment 72 supporting the thrust bearing body 74 is formed on a bottom of the thrust bearing body 74 and made of a strong and wear-resistant material. An imaginary circle C is formed at a position that is spaced at a predetermined distance apart from a circumferential surface A of the thrust bearing body 74.

The second dynamic pressure generating grooves 75 are formed in the thrust bearing body 74 having concentric circles A and B while the second dynamic pressure generating grooves 75 are formed around the thrust bearing body 74 between the circles A and B.

The second dynamic pressure generating grooves 75 have fluid inlets 75a and 75b for introducing the fluid into the second dynamic pressure generating grooves 75 and changing the fluid into a vortex flow during the rotation of the shaft 30 in a clockwise direction.

Also, the second dynamic pressure generating grooves 75 include a first side wall 75c and a second side wall 75d. The first and second side walls 75c and 75d have bending points 75e and 75f, respectively. When the fluid is introduced through the fluid inlets 75a and 75b into the second dynamic pressure generating grooves 75, the fluid is collected at the bending point 75e of the first side wall 75c and forces a pressure to the first side wall 75c.

The bending angles θ1 and θ2 of the first and second side walls 75c and 75d are less than 180°.

The curved portions have a predetermined curvature formed at each edge of the first and second side walls 75c and 75d in order to increase a volume of the fluid which is introduced into the second dynamic pressure generating grooves 75.

Figure 2B:
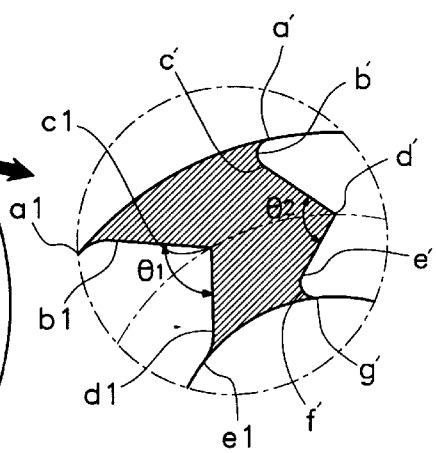

Referring to FIG. 2B, the edges of the second side wall 75d as arcs $a_1b_1$ and $d_1e_1$ are curved in the predetermined curvature without contacting the concentric circles A and B in order to maximize the inlet volume of the fluid. Also, the edges of the first side wall 75c as arcs a'b'c' and e'f'g' are curved in a predetermined curvature in order to maximize the inlet volume of the fluid.

Hereinafter, the operation of the fluid bearing apparatus according to the present invention will be described.

When the shaft 30 rotates, the fluid flows in a rotating direction of the shaft while some of the fluid is introduced through the fluid inlets 75a and 75b into the second dynamic pressure generating grooves 75. Then, fluid introduced into the second dynamic pressure generating grooves 75 moves along the first and second side wall 75c and 75d and is collected at the bending portion 75e and 75f so as to generate a predetermined pressure. As a result, the fluid pressure causes the shaft 30 to break contact with the body 74 of the thrust bearing 70.

When the shaft 30 is shifted upwardly so as to break contact with the thrust bearing 70 by rotating, the fluid flows from the curved portion at an edge of the first side wall 75c and the curved portion at an edge of the second side wall 75d to the second dynamic pressure generating grooves 75. Thus, the pressure at the bending portion 75e increases, thereby the time that the shaft 30 is shifted over the body 74 of the thrust bearing 70 can be reduced. An overload which is forced to the thrust bearing 70 and a friction between the thrust bearing 70 and the shaft 30 are greatly reduced so that the shaft 30 can be stable rotated.

Figure 3:
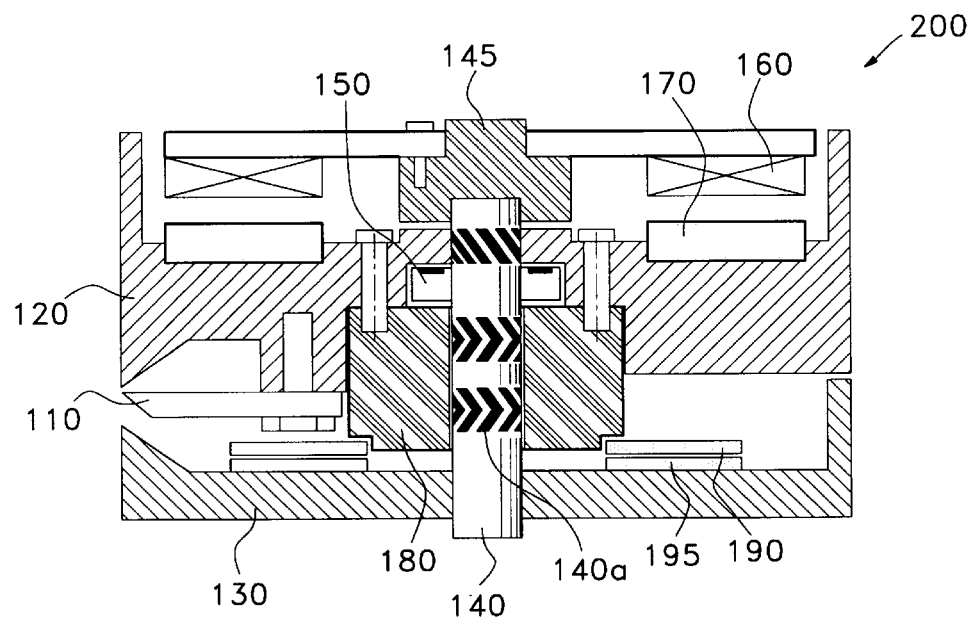
FIG. 3 is a sectional view of a fluid bearing apparatus according to the embodiment of the present invention, which is applied to a head driving motor in a video cassette recorder.
Figure 4A:
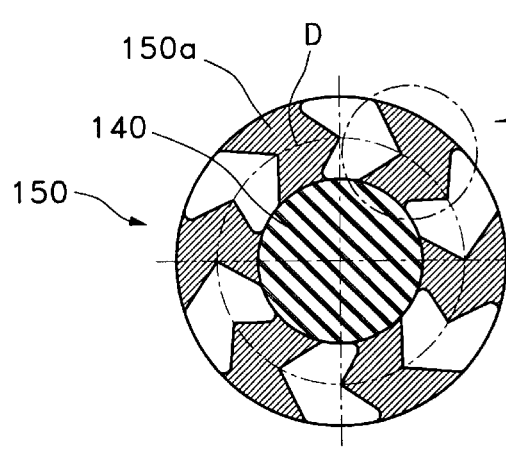
FIGS. 4A–4B are a plan view of dynamic pressure generating grooves in the fluid bearing apparatus of FIG. 3.
Figure 4B:
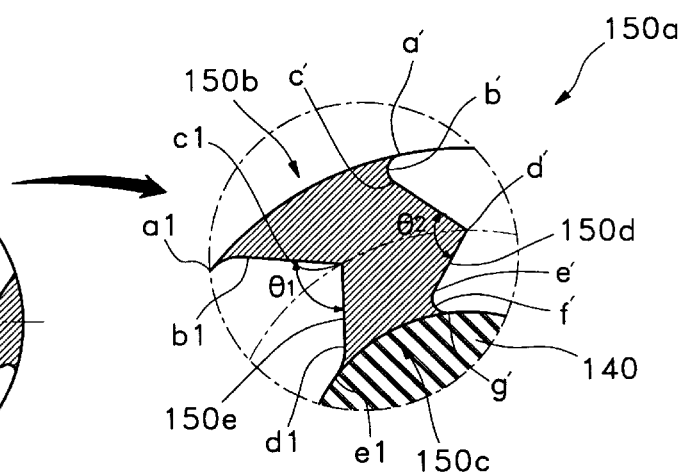

FIG. 3 is a sectional view of a fluid bearing apparatus according to the embodiment of the present invention, which is applied to a head driving motor in a video cassette recorder and FIGS. 4A and 4B are a plan view of dynamic pressure generating grooves in the fluid bearing apparatus of FIG. 3.

A head drum 200 of a video cassette recorder includes an upper drum 120 which is rotatable and has heads 110 mounted on a lower surface thereof to record and reproduce signals of image and voice, a lower drum 130 which is disposed under the upper drum 120 and is fixed to a shaft 140, a thrust bearing 150 which is press-fit to the shaft 140 and has second dynamic pressure generating grooves 150a formed on an upper surface thereof in order to support a thrust load of the upper drum 120, and a driving section 160 and 170.

First dynamic pressure generating grooves 140a having a herringbone shape are formed on a peripheral surface of the shaft 140. The first dynamic pressure generating grooves 140a generate dynamic pressure in order to support radial loads during the high speed rotation of the upper drum 120. A bushing 180 having a diameter larger than an inner diameter of the shaft 140 is fixed to the upper drum 120.

Also, seals (not shown) are disposed between the shaft 140 and the upper drum 120 and the bushing which enclose the shaft to prevent fluid, such as air or oil which flows into the first dynamic pressure generating grooves 140a and second dynamic pressure generating grooves 150a, from leaking from the head drum 200 of the video cassette recorder.

The driving sections 160 and 170, as mentioned above, include a stator fixed to an upper portion of the shaft 140 and a rotor disposed on an upper surface of the upper drum 120. Reference numerals 190 and 195 respectively indicate a rotary transformer and a stationary transformer.

On the other hand, as shown in FIG. 4A, second dynamic pressure generating grooves 150a having a herringbone shape are formed on the upper surface of the thrust bearing 150, of which bending portions are disposed along an imaginary circle D that has a diameter smaller than that of the shaft but larger than that of the thrust bearing.

Furthermore, the second dynamic pressure generating grooves 150a have fluid inlets 150b and 150c so as to increase a volume of the fluid flowing thereinto and curved portions at edges of first and second side walls thereof.

The imaginary circle D is positioned between an inner periphery and an outer periphery of the annular thrust bearing 150 which is press-fit to the shaft 140, on which a desired point $c_1$ is selected and a desired point $d_1$ is selected at a position spaced apart from the point d'. The first and second side walls 150d, 150e, respectively, are formed to extend from each of the points d' and $c_1$ to the inner periphery and the outer periphery of the thrust bearing at angles $\theta_1$ and $\theta2$ (herein, $\theta_1=\theta_2$).

Edges of the first side walls 150d which are in contact with the inner periphery and the outer periphery of the thrust bearing 150 are bent in arcs a'b'c' and e'f'g' to increase the amount of fluid to flow into the second dynamic pressure generating grooves 150a.

Also, edges of the second side walls 150e which are in contact with the inner periphery and the outer periphery of the thrust bearing 150 are bent in arcs $a_1b_1$ and $d_1e_1$ to increase the amount of fluid to flow into the second dynamic pressure generating grooves 150a.

The curved edge is applied to the dynamic pressure generating grooves 150a having a spiral shape so as to increase a volume of the fluid.

The dynamic pressure generating grooves with a spiral shape are formed in such a manner that the sectional area is gradually reduced from the periphery of the thrust bearing 150 to the center of the thrust bearing 150.

While the present invention has been particularly shown and described with reference to a particular embodiment thereof, it will be understood by those skilled in the art that various changes in form and detail may be effected therein without departing from the spirit and scope of the invention as defined by the appended claims.

What is claimed is:

1. A fluid bearing apparatus comprising:

a sleeve for having a bushing portion formed therein;

a shaft for having first dynamic pressure generating grooves formed at a lower portion thereof which faces said bushing;

a thrust bearing having second dynamic pressure generating grooves formed on an upper surface thereof, said second dynamic pressure generating grooves having fluid inlets formed as enlarged portions thereof, said second dynamic pressure generating grooves generating a predetermined fluid pressure when a fluid is introduced into said second dynamic pressure generating grooves through said fluid inlets, said fluid inlets of said second dynamic pressure generating grooves being enlarged for receiving an increased amount of said fluid to be introduced into said second dynamic pressure generating grooves; and a bearing bracket to which said sleeve and said thrust bearing are disposed and fixed, wherein said fluid inlets are provided along an inner and an outer side of each of said second dynamic pressure generating grooves, respectively, said inner side facing the axial center of said thrust bearing and said outer side facing an outer edge of said thrust bearing, wherein said second dynamic pressure generating grooves include first and second side walls of which edges are curved in a predetermined curvature, and wherein said first and second side walls have bending portions, respectively, wherein said fluid is collected at said bending portion of said first side wall which forces a pressure to said first side wall when fluid is introduced through said fluid inlets.

2. A fluid bearing apparatus as claimed in claim 1, wherein said second dynamic pressure generating grooves are formed on a raised body portion of said upper surface of said thrust bearing, wherein said raised body portion extends into said sleeve.

3. A fluid bearing apparatus as claimed in claim 1, wherein said fluid inlets are formed at said inner and outer sides of said second dynamic pressure generating grooves and associated with each other so that said introduced fluids are collected at a central point which is located between said fluid inlets of each of said second dynamic pressure generating grooves.

4. A fluid bearing apparatus as claimed in claim 1, wherein said second dynamic pressure grooves are formed around a central axis of said thrust bearing in a spiral shape.

5. A fluid bearing apparatus comprising:

a sleeve having a bushing portion formed therein;

a shaft having first dynamic pressure generating grooves formed at a lower portion thereof which faces said bushing;

a thrust bearing having second dynamic pressure generating grooves formed on an upper surface thereof, wherein said thrust bearing has a thrust bearing abutment portion formed at an outer portion of said thrust bearing and a thrust bearing body portion extending upwardly from an upper surface of said thrust bearing abutment portion so as to be formed at an inner portion of said thrust bearing, wherein said second dynamic pressure generating grooves are formed on said thrust bearing body portion so as to have an inner and outer circumferential surface, the outer circumferential surface being formed adjacent said thrust bearing abutment portion, and wherein said second dynamic pressure generating grooves include first and second side walls defining fluid inlets which open at the inner and outer circumferential surface, wherein said first and second side walls have edges with predetermined curvatures to maximize an inlet volume of fluid introduced therethrough, and said first and second side walls each have a bending angle to maximize a pressure of the fluid, the edge of the first side wall tapering toward the outer circumferential surface in a direction away from the bending angle thereof and the edge of the second side wall curving toward the bending angle thereof and tapering toward the outer circumferential portion.

* * * * *